(12) United States Patent
Chae et al.

(10) Patent No.: US 8,619,224 B2
(45) Date of Patent: Dec. 31, 2013

(54) LIQUID CRYSTAL DISPLAY APPARATUS AND METHOD OF MANUFACTURING THE SAME

(75) Inventors: Jong-Seok Chae, Yongin (KR); Kon-Ho Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 180 days.

(21) Appl. No.: 13/334,780

(22) Filed: Dec. 22, 2011

(65) Prior Publication Data

US 2012/0300158 A1  Nov. 29, 2012

(30) Foreign Application Priority Data

May 26, 2011  (KR) .................. 10-2011-0050188

(51) Int. Cl.
*G02F 1/1343* (2006.01)
*G02F 1/1339* (2006.01)

(52) U.S. Cl.
USPC ............ 349/139; 349/143; 349/153; 349/190

(58) Field of Classification Search
USPC .................. 349/139, 143, 153, 190
See application file for complete search history.

(56) References Cited

U.S. PATENT DOCUMENTS

| | | | | |
|---|---|---|---|---|
| 6,346,932 | B1* | 2/2002 | Maeda | 345/90 |
| 6,927,818 | B2* | 8/2005 | Hinata et al. | 349/114 |
| 7,092,060 | B2* | 8/2006 | Yoo | 349/141 |
| 7,411,646 | B2* | 8/2008 | Maeda et al. | 349/141 |

FOREIGN PATENT DOCUMENTS

| | | |
|---|---|---|
| JP | 2007-121485 A | 5/2007 |
| KR | 10-0313946 B1 | 10/2001 |
| KR | 10-2005-0047384 A | 5/2005 |
| KR | 10-2008-0074593 A | 8/2008 |

* cited by examiner

*Primary Examiner* — Mike Qi
(74) *Attorney, Agent, or Firm* — Lee & Morse, P.C.

(57) ABSTRACT

Embodiments may be directed to an LCD apparatus including: an array substrate including a pixel electrode in each pixel of a plurality of pixels of an image area; a color filter substrate including a common electrode facing the pixel electrode; and a liquid crystal layer between the array substrate and the color filter substrate, and the common electrode includes a first common electrode corresponding to a center portion of the image area and a second common electrode corresponding to a boundary portion of the image area.

10 Claims, 3 Drawing Sheets

LIQUID CRYSTAL DISPLAY APPARATUS AND METHOD OF MANUFACTURING THE SAME

CROSS-REFERENCE TO RELATED PATENT APPLICATION

This application claims the benefit of Korean Patent Application No. 10-2011-0050188, filed on May 26, 2011, in the Korean Intellectual Property Office, the disclosure of which is incorporated herein in its entirety by reference.

BACKGROUND

1. Field

Embodiments relate to a liquid crystal display (LCD) apparatus and a method of the LCD apparatus.

2. Description of the Related Art

In general, liquid crystal display (LCD) apparatuses include an array substrate, a color filter substrate, and a liquid crystal layer disposed between the array substrate and the color filter substrate. Orientation of liquid crystals in the liquid crystal layer is changed by a voltage applied between the array substrate and the color filter substrate to selectively transmit light emitted from a backlight. Accordingly, desired images are displayed.

SUMMARY

Embodiments may be directed to a liquid crystal display (LCD) apparatus.

According to an embodiment, there may be a liquid crystal display (LCD) apparatus including: an array substrate including a pixel electrode in each pixel of a plurality of pixels of an image area; a color filter substrate including a common electrode facing the pixel electrode; and a liquid crystal layer between the array substrate and the color filter substrate, wherein the common electrode includes a first common electrode corresponding to a center portion of the image area and a second common electrode corresponding to a boundary portion of the image area.

The array substrate may include a first common voltage line for applying a first voltage to the first common electrode and a second common voltage line for applying a second voltage to the second common electrode.

The LCD apparatus may further include: a first conductive protrusion connecting the first common voltage line to the first common electrode; and a second conductive protrusion connecting the second common voltage line to the second common electrode.

The LCD apparatus may further include a driving integrated circuit (IC) connected to the first and second common voltage lines so that the first and second voltages are applied to the first and second common electrodes.

Different voltages may be applied to the first and second common electrodes.

According to another embodiment, there may be a method of manufacturing a liquid crystal display (LCD) apparatus, the method including: preparing an array substrate on which a pixel electrode is in each pixel of a plurality of pixels of an image area; preparing a color filter substrate including a common electrode facing the pixel electrode, the common electrode including a first common electrode corresponding to a center portion of the image area and a second common electrode corresponding to a boundary portion of the image area; and bonding the array substrate and the color filter substrate to each other such that a liquid crystal layer is disposed between the array substrate and the color filter substrate.

The method may further include: forming a first common voltage line for applying a first voltage to the first common electrode on the array substrate; and forming a second common voltage line for applying a second voltage to the second common electrode on the array substrate.

The method may further include: forming a first conductive protrusion for connecting the first common voltage line to the first common electrode; and forming a second conductive protrusion for connecting the second common voltage line to the second common electrode.

The method may further include installing a driving integrated circuit (IC) connected to the first and second common voltage lines so that the first and second voltages are applied to the first and second common electrodes on the array substrate.

Different voltages may be applied to the first common electrode and the second common electrode.

BRIEF DESCRIPTION OF THE DRAWINGS

The above and other features will become more apparent by describing in detail exemplary embodiments thereof with reference to the attached drawings in which.

DETAILED DESCRIPTION

Exemplary embodiments will now be described more fully hereinafter with reference to the accompanying drawings; however, they may be embodied in different forms and should not be construed as limited to the embodiments set forth herein.

Figure 1:
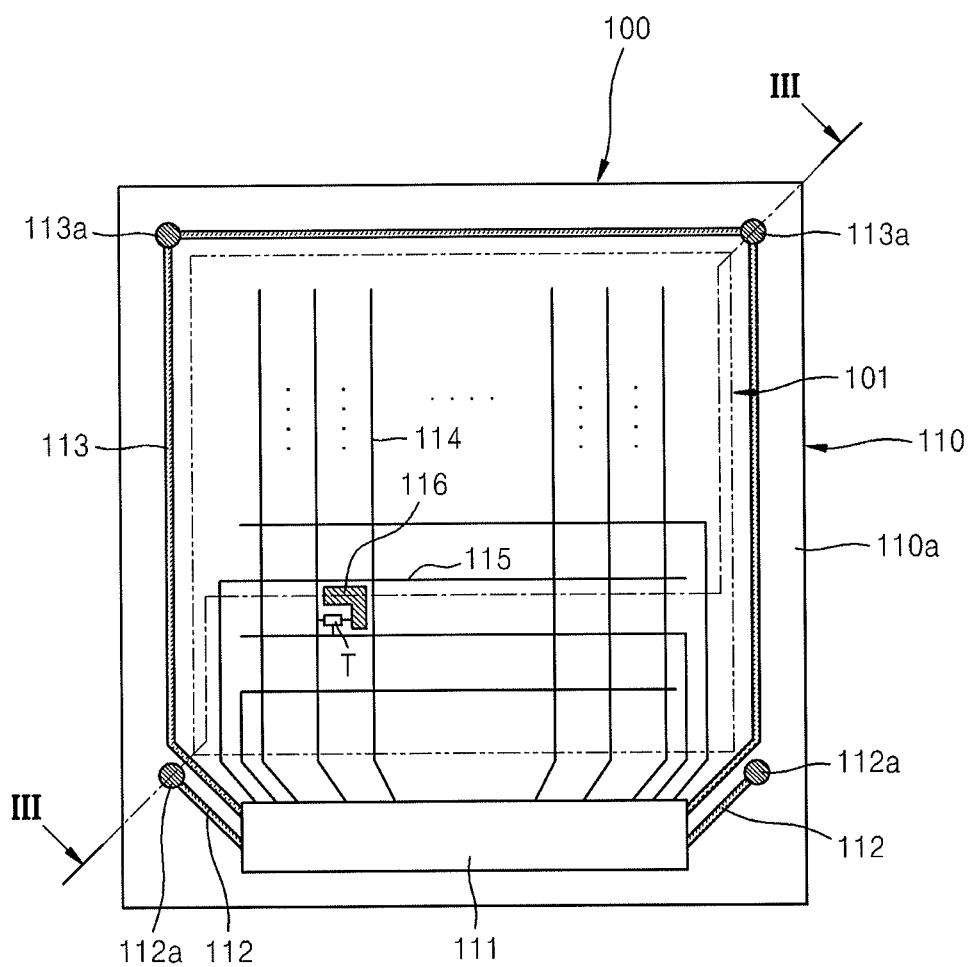
FIG. 1 is a plan view of an array substrate in a liquid crystal display (LCD) apparatus according to an embodiment.

FIG. 1 is a plan view of an array substrate 110 in a liquid crystal display (LCD) apparatus 100 according to an embodiment.

Figure 3:
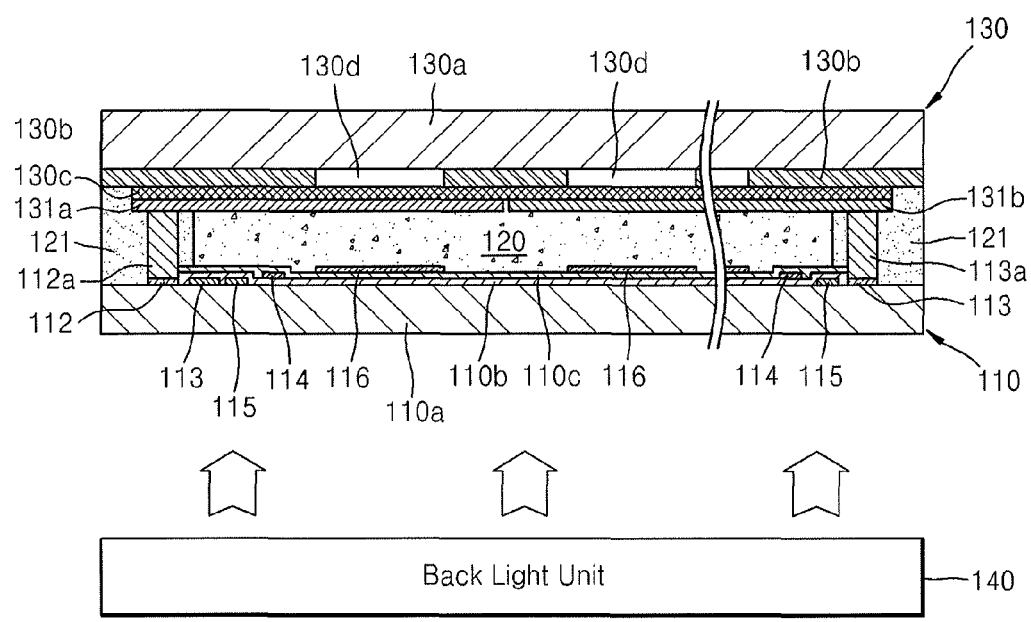
FIG. 3 is a cross-sectional view of the array substrate of FIG. 1 and the color filter substrate of FIG. 2 that are bonded to each other taken along a line III-III of FIG. 1.

A liquid crystal layer 120 and a color filter substrate 130 are stacked on the array substrate 110, and the entire stack structure is shown in FIG. 3.

As shown in FIG. 1, a plurality of gate lines 115 to which scan signals are applied and a plurality of data lines 114 to which data signals are applied are arranged in an image area 101 on a main body 110a of the array substrate 110 to cross each other perpendicularly. A thin film transistor T and a pixel electrode 116 connecting to the thin film transistor T are disposed in each of crossed points between the gate lines 115 and the data lines 114.

In FIG. 1, one thin film transistor T and one pixel electrode 116 are shown for convenience. However, the thin film transistor T and the pixel electrode 116 may be disposed in each of the cross points.

Therefore, when a scan signal and a data signal are respectively applied to the gate line 115 and the data line 114, the thin film transistor T disposed in the portion where the gate line 115 and the data line 114 cross each other applies a voltage signal to the pixel electrode 116 by the scan and data signals. Accordingly, an appropriate voltage is applied between the pixel electrode 116 and first and second common electrodes (131a and 131b, refer to FIG. 3) of the color filter substrate 130 (refer to FIG. 3) to change orientation of liquid crystal in the liquid crystal layer 120 (refer to FIG. 3).

In addition, light emitted from a backlight unit 140 (refer to FIG. 3) is selectively transmitted through the liquid crystal layer 120 according to the change of the liquid crystal orientation to display images.

A driving integrated circuit (IC) 111 applies an appropriate voltage to the pixel electrode 116 via the data line 114, the gate line 115, and the thin film transistor T, and applies appropriate voltages to the first and second common electrodes 131a and 131b via first and second common voltage lines 112 and 113 that are formed along with edges of the main body 110a of the array substrate 110.

Therefore, when the voltages are applied respectively to the data line 114, the gate line 115, and the first and second common voltage lines 112 and 113 by the driving IC 111, an appropriate voltage is formed between the pixel electrode 116 and the first and second common electrodes 131a and 131b connecting to the above lines 114, 115, 112, and 113 for changing the liquid crystal orientation of the liquid crystal layer 120.

First conductive protrusions 112a and second conductive protrusions 113a are formed on the array substrate 110 for connecting the first and second common voltage lines 112 and 113 formed on the array substrate 110 to the first and second common electrodes 131a and 131b formed on the color filter substrate 130.

As shown in FIG. 3, the first and second common voltage lines 112 and 113 are formed on the array substrate 110. The first and second common electrodes 131a and 131b facing the pixel electrode 116 in a state where the liquid crystal layer 120 is disposed between the pixel electrode 116. The first and second common electrodes 131a and 131b are formed on the color filter substrate 130.

Therefore, the first and second common voltage lines 112 and 113 and the first and second common electrodes 131a and 131b are connected to each other via the first and second conductive protrusions 112a and 113a that are connected to the first and second common voltage lines 112 and 113.

In FIG. 3, reference numeral 130a denotes a main body of the color filter substrate 130, reference numeral 130b denotes a black matrix blocking the light, and reference numeral 130c denotes an over-coating layer covering a color filter 130d. In addition, reference numerals 110b and 110c denote insulating layers.

Figure 2:
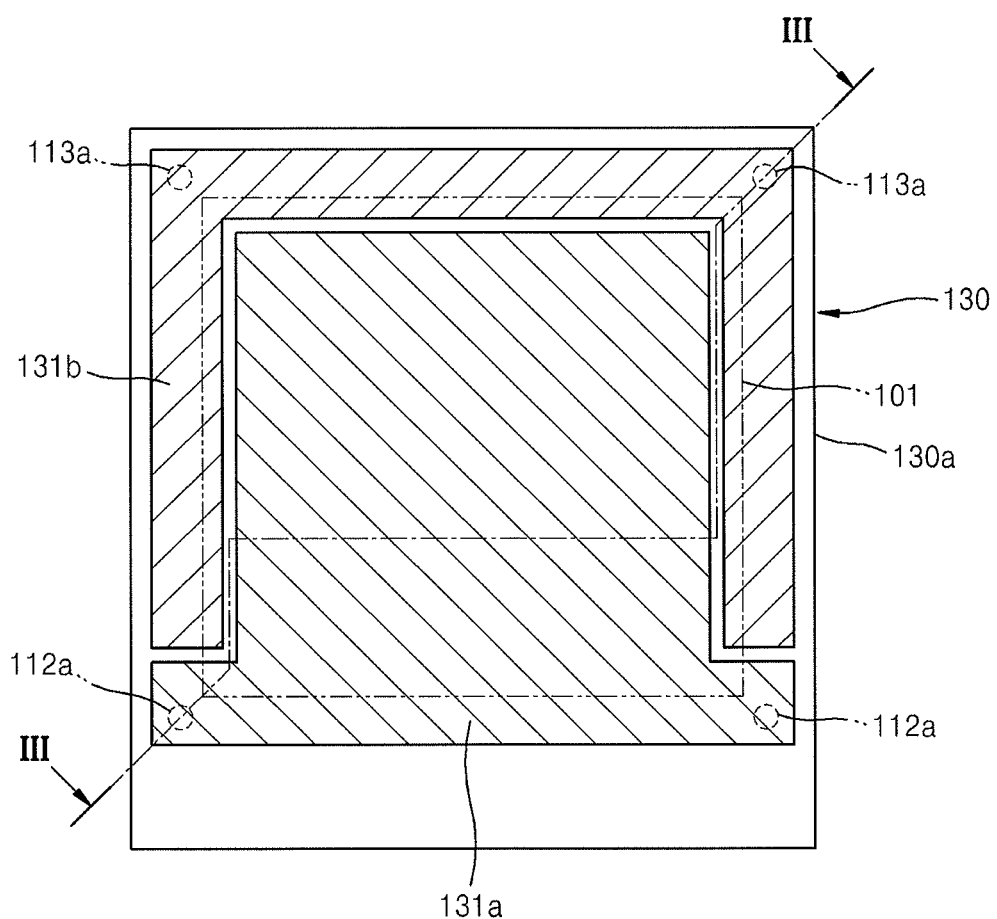
FIG. 2 is a plan view of a color filter substrate in the LCD apparatus according to the embodiment of FIG. 1.

Referring to FIG. 2, the first and second common electrodes 131a and 131b that are electrically insulated from each other are disposed on the color filter substrate 130 as common electrodes facing the pixel electrode 116.

In other words, the common electrode is not formed as a single electrode, but separated as the first common electrode 131a and the second common electrode 131b. Thus, the first common electrode 131a may be located to correspond to a center portion of the image area 101 and the second common electrode 131b may be located to correspond to a boundary portion of the image area 101.

In addition, as described above, the first common electrode 131 is connected to the driving IC 111 via the first conductive protrusion 112a and the first common voltage line 112, and the second common electrode 131b is connected to the driving IC 111 via the second conductive protrusion 113a and the second common voltage line 113. Therefore, since the first and second common electrodes 131a and 131b are connected to the driving IC 111 via different lines from each other, different voltages may be applied to the first and second common electrodes 131a and 131b.

When the different voltages may be applied to the first common electrode 131a disposed on the center portion of the image area 101 and the second common electrode 131b disposed on the boundary portion of the image area 101, a brightness difference between the center portion and the boundary portion of the image area 101 may be compensated for by adjusting the voltages.

As described above, gas generated when hardening a sealant (121, refer to FIG. 3) applied on the LCD apparatus 100 may affect the adjacent boundary portion of the image area 101. Thus, brightness of the corresponding pixels may degrade. If the brightness of the boundary portion of the image area 101 is lower than that of the center portion of the image area 101 due to the above-described problem, the voltages applied to the first and second common electrodes 131a and 131b may be adjusted so that the voltage applied to the boundary portion of the liquid crystal layer 120 becomes higher than the voltage applied to the center portion of the liquid crystal layer 120. Therefore, the degradation of brightness at the boundary portion of the image area 101 may be compensated by the voltage adjustment. Thus, the brightness difference may be offset.

The noticeable difference between brightness at the center portion and the boundary portion of the image area 101, which may cause defects of the LCD apparatus, may be solved by the separation structure of the first and second common electrodes 131a and 131b.

The LCD apparatus 100 having the above structure may be manufactured as follows.

As shown in FIG. 1, the array substrate 110 having the main body 110a on which various lines 112, 113, 114, and 115, the thin film transistor T, the pixel electrode 116, and the driving IC 111 are formed is prepared.

In addition, as shown in FIG. 2, the color filter substrate 130 on which the first and second common electrodes 131a and 131b that are electrically insulated from each other are disposed is prepared. The black matrix 130b, the over-coating layer 130c, and the color filter 130d are formed on the main body 130a of the color filter substrate 130 besides the first and second common electrodes 131a and 131b.

The array substrate 110 and the color filter substrate 130 are bonded to each other by using the sealant 121 so that the liquid crystal layer 120 may be disposed between the two substrates 110 and 130, as shown in FIG. 3. Here, the first common voltage line 112 of the array substrate 110 is connected to the first common electrode 131a via the first conductive protrusion 112a, and the second common voltage line 113 is connected to the second common electrode 131b via the second conductive protrusion 113a.

Therefore, in the LCD apparatus 100 manufactured as described above, different voltages from each other may be applied to the first common electrode 131a disposed on the center portion of the image area 101 and the second common electrode 131b disposed on the boundary portion of the image area 101. Thus, the brightness degradation at the boundary portion of the image area 101 may be compensated by adjusting the voltages applied to the first and second common electrodes 131a and 131b to be different from each other.

By way of summation and review, in a liquid crystal display (LCD) apparatus, orientation of liquid crystals in the liquid crystal layer is changed by a voltage applied between the array substrate and the color filter substrate to selectively transmit light emitted from a backlight. To accomplish this, a pixel electrode, i.e., an anode, is disposed on the array substrate. A common electrode, i.e., a cathode, is disposed on the color filter substrate. Wires are also formed for connecting the pixel and common electrodes to driving integrated circuits (ICs) to apply an appropriate voltage that may change the liquid crystal orientation to the substrates.

Outer circumferential regions of an LCD apparatus have recently been reduced. Thus, a width of a black matrix that blocks the circumferential regions has also been reduced.

However, a sealant that is used to bond an array substrate and a color filter substrate to each other is located under a black matrix located on the circumferential regions. Due to the reduced width of the black matrix, the sealant and an image display area are too close to each other. In other words, the array substrate and the color filter substrate are attached to each other by disposing the sealant in the black matrix region on the circumferential portions. Gas may be generated during irradiating ultraviolet (UV) rays onto the sealant for hardening the sealant. In addition, the gas may affect the adjacent image display area, and brightness of corresponding pixels may degrade.

The brightness on the circumferential portion of the LCD apparatus is much lower than that of a center portion of the LCD apparatus. Thus, fatal defects of the LCD apparatus may occur.

The embodiments disclosed herein advance the art by preventing the foregoing brightness degradation. In this regard, embodiments may be directed to a liquid crystal display (LCD) apparatus having an improved structure for compensating for a brightness difference between a center portion and a circumferential portion of a screen. Therefore, the defect that may be caused by the brightness difference between the center portion and a boundary portion of the image area may be prevented. Thus, defects caused by brightness variation may be reduced and the reliability of the LCD apparatus may be improved.

Exemplary embodiments have been disclosed herein, and although specific terms are employed, they are used and are to be interpreted in a generic and descriptive sense only and not for purpose of limitation.

What is claimed is:

1. A liquid crystal display (LCD) apparatus, comprising:
    an array substrate including a pixel electrode in each pixel of a plurality of pixels of an image area;
    a color filter substrate including a common electrode facing the pixel electrode; and
    a liquid crystal layer between the array substrate and the color filter substrate,
    wherein the common electrode includes a first common electrode corresponding to a center portion of the image area and a second common electrode corresponding to a boundary portion of the image area.

2. The LCD apparatus as claimed in claim 1, wherein the array substrate includes a first common voltage line for applying a first voltage to the first common electrode and a second common voltage line for applying a second voltage to the second common electrode.

3. The LCD apparatus as claimed in claim 2, further comprising:
    a first conductive protrusion connecting the first common voltage line to the first common electrode; and
    a second conductive protrusion connecting the second common voltage line to the second common electrode.

4. The LCD apparatus as claimed in claim 3, further comprising a driving integrated circuit (IC) connected to the first and second common voltage lines so that the first and second voltages are applied to the first and second common electrodes.

5. The LCD apparatus as claimed in claim 1, wherein different voltages are applied to the first and second common electrodes.

6. A method of manufacturing a liquid crystal display (LCD) apparatus, the method comprising:
    preparing an array substrate on which a pixel electrode is in each pixel of a plurality of pixels of an image area;
    preparing a color filter substrate including a common electrode facing the pixel electrode, the common electrode including a first common electrode corresponding to a center portion of the image area and a second common electrode corresponding to a boundary portion of the image area; and
    bonding the array substrate and the color filter substrate to each other such that a liquid crystal layer is disposed between the array substrate and the color filter substrate.

7. The method as claimed in claim 6, further comprising:
    forming a first common voltage line for applying a first voltage to the first common electrode on the array substrate; and
    forming a second common voltage line for applying a second voltage to the second common electrode on the array substrate.

8. The method as claimed in claim 7, further comprising:
    forming a first conductive protrusion for connecting the first common voltage line to the first common electrode; and
    forming a second conductive protrusion for connecting the second common voltage line to the second common electrode.

9. The method as claimed in claim 8, further comprising installing a driving integrated circuit (IC) connected to the first and second common voltage lines so that the first and second voltages are applied to the first and second common electrodes on the array substrate.

10. The method as claimed in claim 6, wherein different voltages are applied to the first common electrode and the second common electrode.

* * * * *